United States Patent
Jiang et al.

(10) Patent No.: US 10,501,690 B2
(45) Date of Patent: Dec. 10, 2019

(54) SOIL HEAVY METAL COMPOSITE PASSIVATOR AND ITS PREPARATION METHOD, USE METHOD AND APPLICATION

(71) Applicant: CHINESE RESEARCH ACADEMY OF ENVIRONMENTAL SCIENCES, Beijing (CN)

(72) Inventors: Yonghai Jiang, Beijing (CN); Xinying Lian, Beijing (CN); Beidou Xi, Beijing (CN); Yu Yang, Beijing (CN); Xu Han, Beijing (CN); Huan Huan, Beijing (CN); Fu Xia, Beijing (CN)

(73) Assignee: CHINESE RESEARCH ACADEMY OF ENVIRONMENTAL SCIENCES, Beijing (CN)

( * ) Notice: Subject to any disclaimer, the term of this patent is extended or adjusted under 35 U.S.C. 154(b) by 0 days.

(21) Appl. No.: 16/181,037

(22) Filed: Nov. 5, 2018

(65) Prior Publication Data

US 2019/0144749 A1    May 16, 2019

(30) Foreign Application Priority Data

Nov. 15, 2017   (CN) .......................... 2017 1 1133537

(51) Int. Cl.
*B09C 1/00*    (2006.01)
*C09K 17/44*   (2006.01)
*B09C 1/08*    (2006.01)

(52) U.S. Cl.
CPC ................ *C09K 17/44* (2013.01); *B09C 1/08* (2013.01); *B09C 2101/00* (2013.01)

(58) Field of Classification Search
CPC ........ C09K 17/40; C09K 17/42; C09K 17/44; B09C 1/08; A62D 3/00; A62D 3/30
See application file for complete search history.

(56) References Cited

U.S. PATENT DOCUMENTS

2006/0052653 A1*  3/2006  Chowdhury .......... B09B 3/0041
                                                      588/312

FOREIGN PATENT DOCUMENTS

CN           104058896 A  *  9/2014

* cited by examiner

*Primary Examiner* — Janine M Kreck
(74) *Attorney, Agent, or Firm* — Seed IP Law Group LLP

(57) ABSTRACT

A soil heavy metal composite passivator and its preparation method, use method and application. The passivator is a powder particle obtained mainly by mixing modified palygorskite, biomass charcoal, quicklime and fungus residue in a mass ratio of 1:(0.3~0.5):(0.5~0.8):(0.2~0.4), with an average particle size of 0.5~1 mm. The invention further provides preparation and use methods for the above soil heavy metal composite passivator. The soil heavy metal composite passivator according to the invention can effectively passivate heavy metal pollution in farmland soil and reduce bioavailability of various heavy metals in soil so as to recover ecological and industrial functions of the soil and improve crop quality. Material selected in the present invention are safe and environmental-friendly, realized "waste control by waste itself", have long service life, and do not cause secondary pollution to soil.

11 Claims, No Drawings

SOIL HEAVY METAL COMPOSITE PASSIVATOR AND ITS PREPARATION METHOD, USE METHOD AND APPLICATION

TECHNICAL FIELD

The present invention relates to the category of polluted soil remediation in the field of environmental protection, in particular to a soil heavy metal composite passivator and its preparation method, use method and application.

BACKGROUND

In recent years, due to the rapid development of industrialization, discharge of a large amount of industrial waste water from mining, smelting, coal-burning, papermaking, etc has caused a drastic increase in heavy metal pollutants in soil of China. Due to heavy metals cannot be degraded by microorganisms, it is difficult to be eliminated, and accumulation of these metals to a certain extent in soil can cause toxicity to soil plant system, these result in degradation of soil quality and reduction in crop yield and quality. In China, grain production is decreased as high as 10 million tons every year due to soil heavy metal pollution, and there are 12 million tons of grains having the content of heavy metals above the national standards. More importantly, heavy metals may be also migrated to animals and humans through food chain, severely endangering animal and human health and affecting ecological environment security.

At present, an idea for treating heavy metal pollution in soil has been changed from complete removal of heavy metals to implementation of risk-based control strategies. The indicator that truly affects soil risk is the bioavailability of heavy metals. Therefore, reducing the bioavailability of heavy metals is one of the effective ways to control heavy metal polluted soil. In-situ passivation of heavy metals in soil is to change the form of heavy metals in the soil by adding passivator to heavy metal polluted soils, mainly aiming to convert exchangeable and carbonate bound forms of heavy metals with high bioavailability to organic bound and residual forms of the heavy metals with low bioavailability. This technology has been widely concerned because of its short processing time, simple operation, quick response, and suitability for large-area pollution treatment.

A key to the in-situ passivation of heavy metals in soil is the preparation and use of passivator. Currently, commonly used passivators are mainly classified into inorganic, organic, microbial, and novel composite materials. In practical soil environment, heavy metal pollution is mostly combined pollution of two or more elements, and common defects of the first three types of single material are that types of pollutants treated are also relatively monotonous, and limitations are relatively large, so the combined pollution in soil is poorly treated. Therefore, focusing on all types of environmental materials and their combined use, and developing new composite materials through chemical synthesis, modification, composting, etc. are main directions for future development of the in-situ passivation of heavy metals in soil.

SUMMARY

In light of this, a main object of the present invention is to provide a soil heavy metal composite passivator and its preparation method, use method and application so as to at least partially solve at least one of the above-mentioned technical problems.

In order to achieve the above object, the technical solutions of the present invention are as follows:

In an aspect of the present invention, there is provided a soil heavy metal composite passivator, which is obtained mainly by mixing modified palygorskite, biomass charcoal, quicklime and fungus residue uniformly in a mass ratio of 1:(0.3~0.5):(0.5~0.8):(0.2~0.4).

Preferably, the modified palygorskite is obtained by modifying palygorskite through a silane coupling agent, which is preferably chloropropyltrimethoxysilane.

The biomass charcoal is obtained by pressurized pyrolysis of poultry feathers.

The fungus residue is obtained by composting a medium obtained from cultivation of edible fungi.

Preferably, the passivator is in the form of powder particles with an average particle size of 0.5~1 mm.

In another aspect of the present invention, there is provided a method for preparing a soil heavy metal composite passivator, comprising: mixing palygorskite modified through a coupling agent, biomass charcoal obtained by pyrolysis, quicklime, and composted fungus residue uniformly in a mass ratio of 1:(0.3~0.5):(0.5~0.8):(0.2~0.4).

Preferably, preparing of the modified palygorskite comprises steps of:

(1) immersing palygorskite in an acid solution, filtering and drying;

(2) under protection of $N_2$, subjecting the dried palygorskite to coupling reaction in an organic solution containing a silane coupling agent;

(3) filtering the resultant, washing with an organic solvent and drying, and then pulverizing into particles with an average particle size of 0.5~1 mm for use.

Preferably, preparing of the biomass charcoal comprises steps of:

(1) placing pretreated poultry feathers in a crucible for compacting, sealing and pressurized pyrolysis, wherein the poultry feathers are selected from one or more of chicken feathers, duck feathers and goose feathers;

(2) crushing the pyrolysis resultant into particles with an average particle size of 0.5~1 mm for use.

Preferably, preparing of the fungus residue comprises steps of:

(1) composting and decaying a medium obtained from cultivation of edible fungi;

(2) drying and pulverizing the decayed compost into particles with an average particle size of 0.5~1 mm for use.

Preferably, in the step (1), during an early period of composting, compost is turned over once a day; during a later period of composting, the compost is turned over once every 2~3 days; and water is sprayed for the compost material while it is turned over each time so as to keep the moisture content at 60%.

In a further aspect of the present invention, there is provided a method for using the soil heavy metal composite passivator as described above, comprising: mixing the soil heavy metal composite passivator with polluted soil uniformly in a mass ratio of 1:(10~50); adding water to the contaminated soil so that the water retention rate was 60~65%; after 5~30 days of reaction, converting heavy metal ions in the contaminated soil into a more stable organic bound and residual forms.

In yet another aspect of the present invention, there is provided application of the soil heavy metal composite passivator as described above to remediation of heavy metal polluted soil.

Based on the above technical solutions, the present invention brings the following advantageous effects:

1. The raw materials of the soil heavy metal composite passivator according to the present invention have larger specific surface area after modification, composting and heat treatment, so that they have higher adsorption activity and complexation, which is favorable for significant change in heavy metal forms and can reduce their bioavailability obviously.

2. The soil heavy metal composite passivator according to the present invention can effectively reduce the bioavailability of various composite heavy metals such as Pb, Cd, Cu, Zn, As and Hg, etc. in soil, and have a wide range of use.

3. The soil heavy metal composite passivator according to the present invention is safe and environment-friendly, realize "waste control by waste itself", has long service life, and does not cause secondary pollution to soil.

DETAILED DESCRIPTION

To make the objects, the technical solutions and the advantages of the present invention more apparent, the present invention will be further described in detail in conjunction with the specific examples.

The soil heavy metal composite passivator according to the present invention is a powder particle which is obtained mainly by mixing modified palygorskite, biomass charcoal, quicklime and fungus residue in a mass ratio of 1:(0.3~0.5):(0.5~0.8):(0.2~0.4), and can effectively reduce the bioavailability of heavy metals in soil. Preferably, the powder particle has an average particle size of 0.5~1 mm.

Wherein, the modified palygorskite is obtained by modifying palygorskite through a silane coupling agent. In an exemplary embodiment, the modified palygorskite is obtained through chloropropyltrimethoxysilane.

The biomass charcoal is obtained by pressurized pyrolysis of poultry feathers, which may be selected from one or more of chicken feathers, duck feathers, goose feathers and the like.

The fungus residue is obtained by composting a medium obtained from cultivation of edible fungi.

The present invention further provides a method for preparing a soil heavy metal composite passivator, comprising: mixing palygorskite modified through a coupling agent, biomass charcoal obtained by pyrolysis, quicklime, and composted fungus residue uniformly in a mass ratio of 1:(0.3~0.5):(0.5~0.8):(0.2~0.4).

Wherein, preparing of the modified palygorskite comprises:

To begin with, a palygorskite material with an average particle size of 0.5~1 mm is selected and immersed for 3 days in an acid solution, for example, a 0.1 mol/L hydrochloric acid solution, under dustproof and aseptic operation conditions. The immersed palygorskite is filtered, and dried preferably at 150° C. under vacuum.

Next, under protection of $N_2$, the dried palygorskite is placed in an organic solution containing a silane coupling agent such as chloropropyltrimethoxysilane, stirred overnight at room temperature, and then refluxed at 200° C. for 24 hours to filter the resultant.

The filtered resultant is washed with an organic solvent and then dried. It can be washed through Soxhlet extraction with a benzene solution for 12 hours, filtered, then washed with ether several times, dried at 70° C. in vacuum and crushed into particles with an average particle size of about 0.5 to 1 mm for further use.

The raw material of the biomass charcoal may be selected from one or more of chicken feathers, duck feathers, goose feathers and the like. Its preparation method comprises: placing cleaned poultry feathers in a crucible for compacting, sealing and pressurized pyrolysis. Specifically, it can be placed in a vacuum muffle furnace, pyrolyzed at a constant temperature of 350° C. for 40 mins, and cooled to room temperature so as to obtain biomass charcoal, and then the resultant is crushed into particles with an average particle size of about 0.5~1 mm for further use.

Fungus residue is obtained by composting and decaying a medium obtained from cultivation of edible fungi, for example, composting at 90° C. for 7~10 days. During an early period of composting, compost is turned over once a day; during a later period of composting, the compost is turned over once every 2~3 days; and water is sprayed for the compost material while it is turned over each time so as to keep its moisture content always at 60~65%. The decayed compost is dried and pulverized via a pulverizer into particles with an average particle size of about 0.5 to 1 mm for further use.

Finally, at room temperature and atmosphere pressure, the resultant and quicklime is mixed, the modified palygorskite, biomass charcoal, quicklime and fungus residue are mixed uniformly in a mass ratio of 1:(0.3~0.5):(0.5~0.8):(0.2~0.4) so as to obtain the target product with an average particle size of 0.5 to 1 mm.

A method for using the soil heavy metal composite passivator according to the present invention comprising: mixing the soil heavy metal composite passivator according to the present invention with heavy metal polluted soil in a mass ratio of 1:(10~50), stirring uniformly, and adding a certain amount of water to the polluted soil to keep the soil moist and ensure that its water retention rate is 60% (mass content, the same below) or so. After 5 to 30 days of reaction, heavy metal ions in the polluted soil are converted into more stable organic bound and residual forms, which can reduce their bioavailability.

Specific examples will be illustrated hereinafter so as to further describe the technical solutions of the present invention.

EXAMPLE 1

A palygorskite material with an average particle size of 1 mm was selected and immersed in a 0.10 mol/L hydrochloric acid solution for 3 days under dustproof and aseptic operation conditions. The immersed palygorskite was filtered, and dried at 150° C. under vacuum. Next step, under protection of $N_2$, the dried palygorskite was placed in an organic solution containing chloropropyltrimethoxysilane, stirred overnight at room temperature, and then refluxed at 200° C. for 24 hours, the resultant is filtered. The filtered resultant was washed through Soxhlet extraction with a benzene solution for 12 hours, filtered, then washed with ether for several times, dried at 70° C. under vacuum and crushed into particles with an average particle size of about 1 mm for further use.

Pretreated duck feathers was placed in a crucible for compacting and sealing, specifically, in a vacuum muffle furnace, pyrolyzed at a constant temperature of 350° C. for 40 mins, cooled to room temperature and then crushed into particles with an average particle size of about 1 mm for further use.

A medium obtained after harvesting cultivated edible fungi was selected and composted at 90° C. for 10 days. During the first 3 days of composting, compost was turned over once a day; during the later 7 days of composting, the compost was turned over once every 2~3 days; and water was sprayed for the compost material while it was turned over each time so as to keep its moisture content always at 60%. The decayed compost was dried and pulverized via a pulverizer into particles with an average particle size of about 1 mm for further use.

Finally, at room temperature and atmosphere pressure, the above resultant is mixed with quicklime, modified palygorskite, biomass charcoal, quicklime, and fungus residue were mixed uniformly in a mass ratio of 1:0.3:0.6:0.4 so as to obtain the target product with an average particle size of 1 mm.

The prepared soil heavy metal composite passivator and soil polluted by heavy metals of Pb, Cd and As were mixed in a mass ratio of 1:20 and mixed uniformly. A certain amount of water was added to the soil to keep the soil moist and ensure that its water retention rate is 60% or so. After 20 days of reaction, the bioavailability of Pb in polluted soil was reduced by 40%, the bioavailability of Cd was reduced by 65%, and the bioavailability of As was reduced by 50%.

EXAMPLES 2-3

Embodiment 2-3 are specific examples of the soil heavy metal composite passivator and its preparation method and use method according to the present invention, different from Example 1 in formulation of the soil heavy metal composite passivator and its formulation materials and usage amount. Specific parameters and effects are shown in Table 1.

The specific embodiments described above further illustrate the objects, technical solutions and advantageous effects of the present invention. It should be understood that the above descriptions are only exemplary embodiments of the present invention and not intended to limit the present invention. Any modification, equivalent replacement, or improvement made within the spirit and principle of the present invention shall fall within the protection scope of the present invention.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, including but not limited to Chinese Patent Application No. 201711133537.5, filed Nov. 15, 2017, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A soil heavy metal composite passivator obtained mainly by mixing modified palygorskite, biomass charcoal,

TABLE 1

Data Sheet for Soil Heavy Metal Composite Passivator

| | | Examples | | |
|---|---|---|---|---|
| Types | | Example 1 | Example 2 | Example 3 |
| modified palygorskite | Formulation amount | 1 | 1 | 1 |
| | Modification reagent | chloropropyltrimethoxysilane | vinyl triethoxysilane | Aminopropyltriethoxysilane |
| biomass charcoal | Formulation amount | 0.3 | 0.5 | 0.45 |
| | Pyrolyzed material | Duck feathers | Chicken feathers | Goose feathers |
| quicklime | Formulation amount | 0.6 | 0.8 | 0.7 |
| fungus residue | Formulation amount | 0.4 | 0.2 | 0.2 |
| Composite passivator | Particle size | 1 | 0.8 | 0.5 |
| | Passivator amount (passivator: soil) | 1:20 | 1:40 | 1:50 |
| Heavy metal remediation effect | Reduced amount in bioavailbility of Pd | 40% | 45% | 55% |
| | Reduced amount in bioavailbility of Cd | 65% | 62% | 67% |
| | Reduced amount in bioavailbility of As | 50% | 65% | 74% | quicklime and fungus residue uniformly in a mass ratio of 1:(0.3~0.5):(0.5~0.8):(0.2~0.4).

2. The soil heavy metal composite passivator according to claim 1, wherein the modified palygorskite is obtained by modifying palygorskite through a silane coupling agent;
the said biomass charcoal is obtained by pressurized pyrolysis of poultry feathers;
the fungus residue is obtained by composting a medium obtained from cultivation of edible fungi.

3. The soil heavy metal composite passivator according to claim 1, wherein the passivator is in the form of powder particles with an average particle size of 0.5~1 mm.

4. The soil heavy metal composite passivator of claim 2, where the silane coupling agent is chloropropyltrimethoxysilane.

5. A method for remediating heavy metal-polluted soil, the method comprising treating the heavy metal-polluted soil with soil heavy metal composite passivator of claim 1.

6. The method of claim 5 wherein treating the heavy metal-polluted soil comprise:
mixing the soil heavy metal composite passivator with heavy metal-polluted soil uniformly in a mass ratio of 1:(10~50) to provide a contaminated soil mixture;
adding water to the contaminated soil mixture so that the water retention rate was 60~65%; whereby, after 5~30 days of reaction, heavy metal ions in the contaminated soil mixture are converted into more stable organic bound and residual forms.

7. A method for preparing a soil heavy metal composite passivator, comprising: mixing palygorskite modified through a coupling agent, biomass charcoal obtained by pyrolysis, quicklime, and composted fungus residue uniformly in a mass ratio of 1:(0.3~0.5):(0.5~0.8):(0.2~0.4).

8. The method according to claim 7, wherein preparing of the modified palygorskite comprises steps of:
(1) immersing palygorskite in an acid solution, filtering and drying;
(2) under protection of $N_2$, subjecting the dried palygorskite to coupling reaction in an organic solution containing a silane coupling agent;
(3) filtering the resultant, washing with an organic solvent and drying, and then, pulverizing into particles with an average particle size of 0.5~1 mm for use.

9. The method according to claim 7, wherein preparing of the biomass charcoal comprises steps of:
(1) placing pretreated poultry feathers in a crucible for compacting, sealing and pressurized pyrolysis, wherein the poultry feathers are selected from one or more of chicken feathers, duck feathers and goose feathers;
(2) crushing the pyrolysis resultant into particles with an average particle size of 0.5~1 mm for use.

10. The method according to claim 7, wherein preparing of the fungus residue comprises steps of:
(1) composting and decaying a medium obtained from cultivation of edible fungi;
(2) drying and pulverizing the decayed compost into particles with an average particle size of 0.5~1 mm for use.

11. The method according to claim 10, wherein in the step (1), during a first period of composting, compost is turned over once a day; thereafter, during a later second period of composting, the compost is turned over once every 2~3 days; and water is sprayed for the compost material while it is turned over each time so as to keep the moisture content at 60~65%.

* * * * *